United States Patent [19]

Binns

[11] E Patent Number: Re. 31,950

[45] Reissued Date of Patent: Jul. 16, 1985

[54] ALTERNATING CURRENT GENERATORS AND MOTORS

[75] Inventor: Kenneth J. Binns, Chandler's Ford, England

[73] Assignee: National Research Development Corporation, London, England

[21] Appl. No.: 963,891

[22] Filed: Nov. 27, 1978

Related U.S. Patent Documents

Reissue of:

[64] Patent No.: 3,849,682
Issued: Nov. 19, 1974
Appl. No.: 371,541
Filed: Jun. 19, 1973

U.S. Applications:

[63] Continuation of Ser. No. 742,916, Nov. 17, 1976, abandoned.

[30] Foreign Application Priority Data

Jun. 21, 1972 [GB] United Kingdom ..... 29180

[51] Int. Cl.[3] ..... H02K 21/16
[52] U.S. Cl. ..... 310/156; 310/263
[58] Field of Search ..... 310/156, 162-165, 310/117, 119, 126, 261, 262, 269, 166, 152

[56] References Cited

U.S. PATENT DOCUMENTS

| | | | |
|---|---|---|---|
| 2,632,123 | 3/1953 | Kober | 310/156 |
| 2,784,331 | 3/1957 | Rodemann | 310/126 X |
| 3,462,627 | 8/1969 | Schwab et al. | 310/262 X |
| 3,513,341 | 5/1970 | Gratzmuller | 310/156 |
| 3,517,237 | 6/1970 | Lloyd | 310/156 X |
| 3,553,511 | 1/1971 | Hemmings et al. | 310/263 X |
| 3,696,260 | 10/1972 | Lace | 310/156 |
| 3,849,682 | 11/1979 | Binns | 310/156 |

FOREIGN PATENT DOCUMENTS 1164391 10/1958 France .

*Primary Examiner*—Donovan F. Duggan
*Attorney, Agent, or Firm*—Cushman, Darby & Cushman

[57] ABSTRACT

A rotor for an electrical alternator or motor is described. The rotor has a number of disc shaped, axially magnetized, permanent magnets separated by steel discs, and elongated pole shoes parallel to the rotor axis making up the rotor periphery. The pole shoes are fixed to appropriate steel discs to give pole-shoe polarities which alternate around the rotor periphery. In order to [allow starting as a motor] *stabilize the machine*, alternate pole shoes are divided near one end and fixed to the same steel discs as transversely adjacent pole shoes [to give a solid metal rotor section which gives starting by induction motor action, and forms a toothed wheel which runs at synchronous speed by reluctance motor action].

23 Claims, 4 Drawing Figures

ALTERNATING CURRENT GENERATORS AND MOTORS

Figure 1:
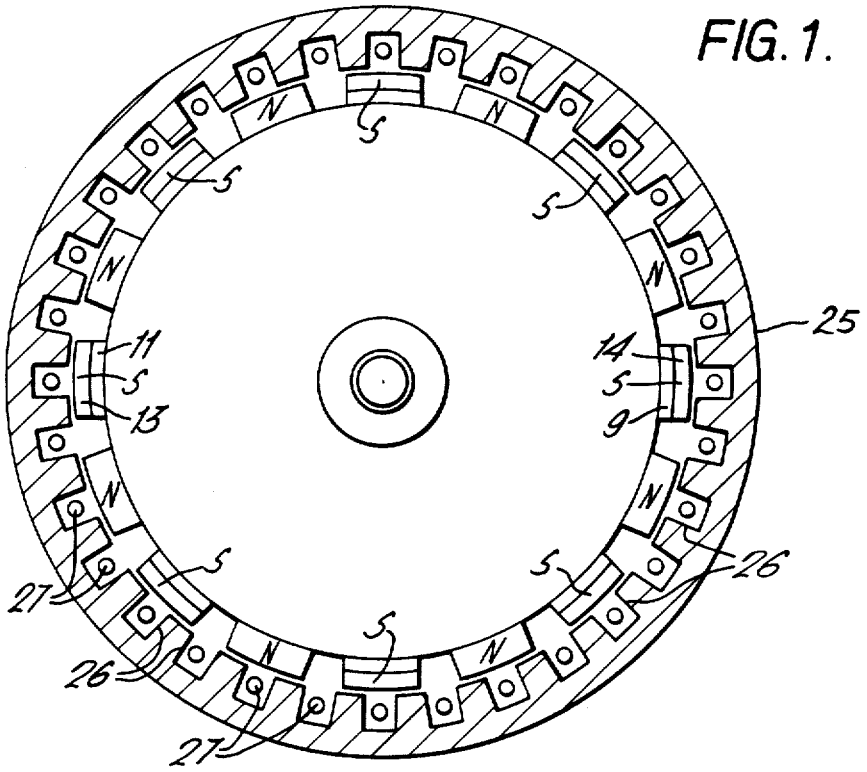

Matter enclosed in heavy brackets [ ] appears in the original patent but forms no part of this reissue specification; matter printed in italics indicates the additions made by reissue.

*This is a continuation of application Ser. No. 742,916, filed Nov. 17, 1976, now abandoned.*

The present invention relates to permanent magnet rotors for alternating-current generators or motors, including stepping motors.

Some known permanent magnet rotors comprise one or more thin generally annular permanent magnets having a number of radially projecting pole parts on their periphery. Pole shoes are arranged on the pole parts and overlap the latter in the peripheral direction. A metal hub is arranged in the centre of the openings in the magnet elements. Alternating-current generators having permanent magnet rotors of this kind are used particularly as generators for motor vehicles.

A single permanent magnet element may be used in which case the number of poles is limited. Sometimes two magnet elements are used and are spaced apart along the rotor axis so that the pole parts of one permanent magnet element are axially aligned with the gaps between the pole parts in the other permanent magnet element. In both cases the magnets are radially magnetised.

A disadvantage of this known form of construction is that the magnets are of complicated shape and can become demagnetised in use unless expensive metallic magnets of high coercivity are employed. Centrifugal forces prevent the use of ceramic permanent magnets such as those made of barium ferrite.

According to a first aspect of the present invention there is provided an alternating current electrical machine including a stator having an inner periphery with slots containing conductors of a distributed winding, and a rotor mounted to rotate with its outer periphery adjacent to the inner periphery of the stator, the rotor comprising a plurality of permanent magnets, spaced apart along the axis of rotation of the rotor, [with their magnetic axes coincident with the axis of rotation and ] with their directions of magnetization parallel to the said axis, a plurality of *main* pole shoes spaced apart around the rotor periphery [and extending substantially continuously for at least three quarters of the whole axial length of the rotor periphery,] and a plurality of flux guides arranged to couple the poles of the permanent [magnets] *magnet* to the *main* pole shoes magnetically to give the *main* pole shoes polarities which alternate around the rotor periphery, but which are the same in the axial direction of the rotor over more than half the length of the outer periphery of the rotor, the flux guides and the pole shoes being arranged to ensure that the flux density at the *main* pole shoes is high compared with that at the permanent magnet means *and the rotor including a stabilizing region having a periphery substantially formed from a plurality of circumferentially spaced salient portions of magnetic material defining spaces therebetween and a coupling portion joining substantially every salient portion to its neighboring salient portions on both sides thereof by means of a path in magnetic material, said path not including the permanent magnet means or any axial shaft for the rotor.*

Preferably the permanent magnet means include generally discshaped magnets separated by generally disc-shaped elements of the flux guides extending radially of the rotor axis, with the pole shoes supported by elements carrying flux of the appropriate polarity for the required alternation of pole-shoe polarities. Other forms of permanent magnet means are, for example, magnets which, like disc magnets, are short in the direction of the magnetic axis and of large pole area but which are other than disc shaped.

One advantage of the rotor according to the invention is that it can be made as long in the axial direction as is required by the addition of disc-shaped magnets and radial elements, and by extending the axial length of the pole shoes. Hence the rotor can be made to fit almost any conventional induction motor stator having a distributed winding.

A further advantage is that while magnets magnetised in the radial direction must with present materials be of expensive material in order to obtain a satisfactory flux density, the use of axial magnets allows more economic material such as barium ferrite to be used. The flux density obtainable from these magnets is not so high but by using large pole area magnets and by a suitable choice of radial element and pole shoe dimensions, a relatively high flux density at the poles may be achieved.

According to a second aspect of the present invention there is provided a permanent magnet rotor for an alternating current generator or motor, including at least two generally disc-shaped axially magnetised permanent magnets each having an aperture at its centre, on each side of which magnets are generally disc-shaped elements of magnetic material with central apertures and a number of radially projecting pole parts on their outer peripheries. [Pole] *Main pole* shoes are arranged radially on the pole parts [and extend substantially continuously for at least three quarters of the whole axial length of the rotor periphery] *extending over the said elements in the axial direction*, and a metal hub, having at least a periphery of non-magnetic material, which passes through the apertures in the magnets and the elements, the elements being so arranged that pole parts of elements adjacent to permanent magnet poles of the same polarity are substantially axially aligned with one another and with gaps between the pole parts of elements adjacent to permanent magnet poles of the opposite polarity and the disc shaped elements, the pole parts and the pole shoes being arranged to insure that the flux density of the pole shoes is high compared with that at the permanent magnets, *and the rotor including a stabilizing region having a periphery substantially formed from a plurality of circumferentially spaced salient portions of magnetic material defining spaces therebetween and a coupling portion joining substantially every salient portion to its neighboring salient portions on both sides thereof by means of a path in magnetic material, said path not including the permanent magnets.*

Figure 2:
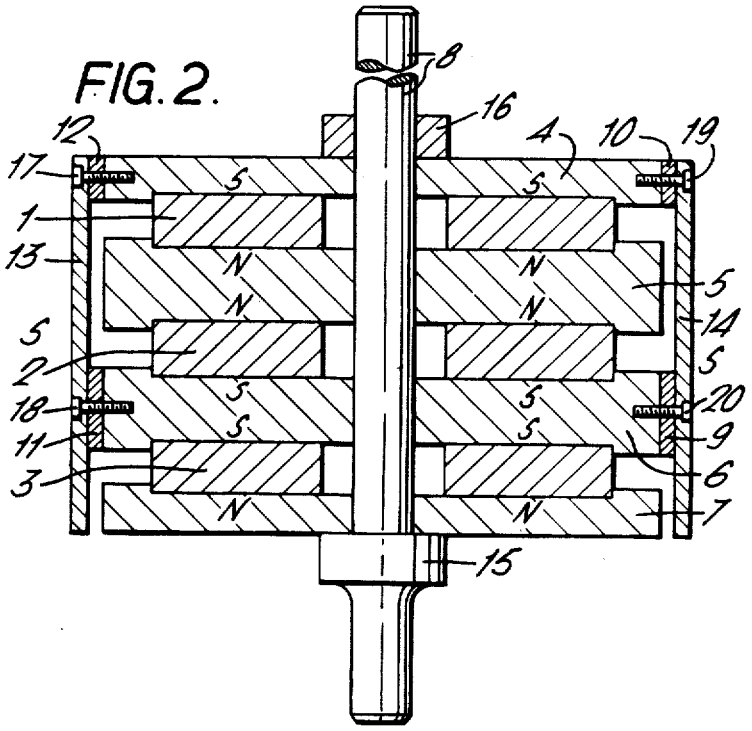
Figure 3:
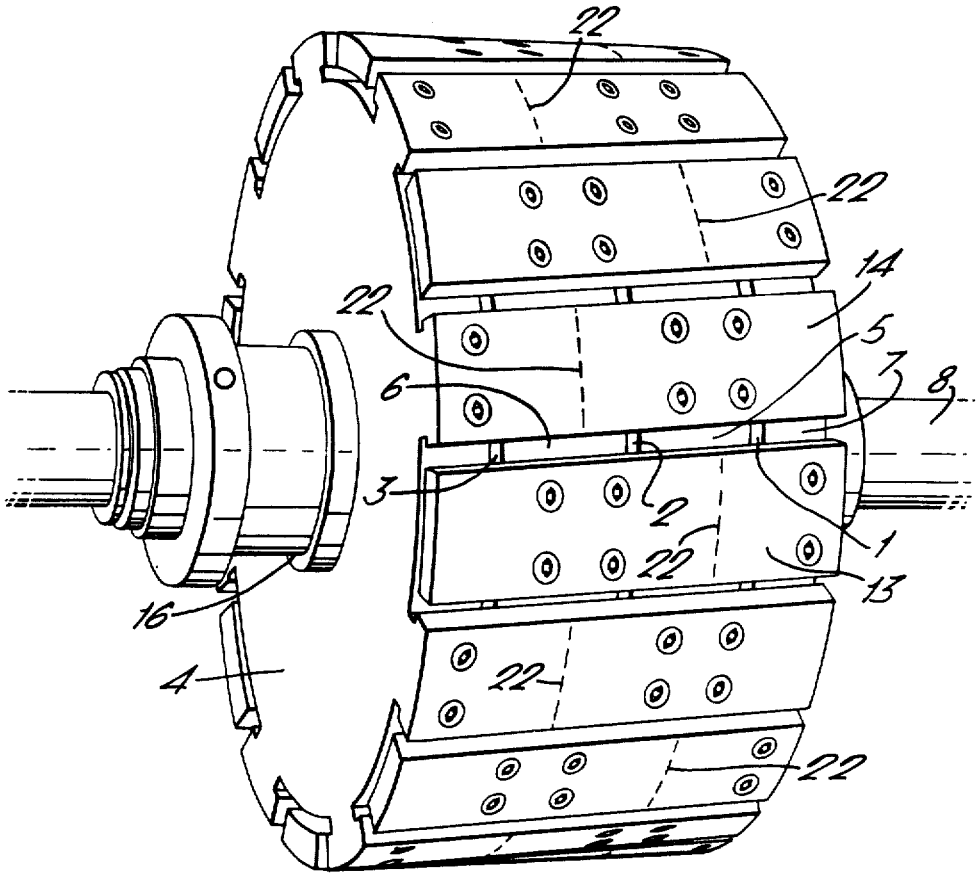
Figure 4:
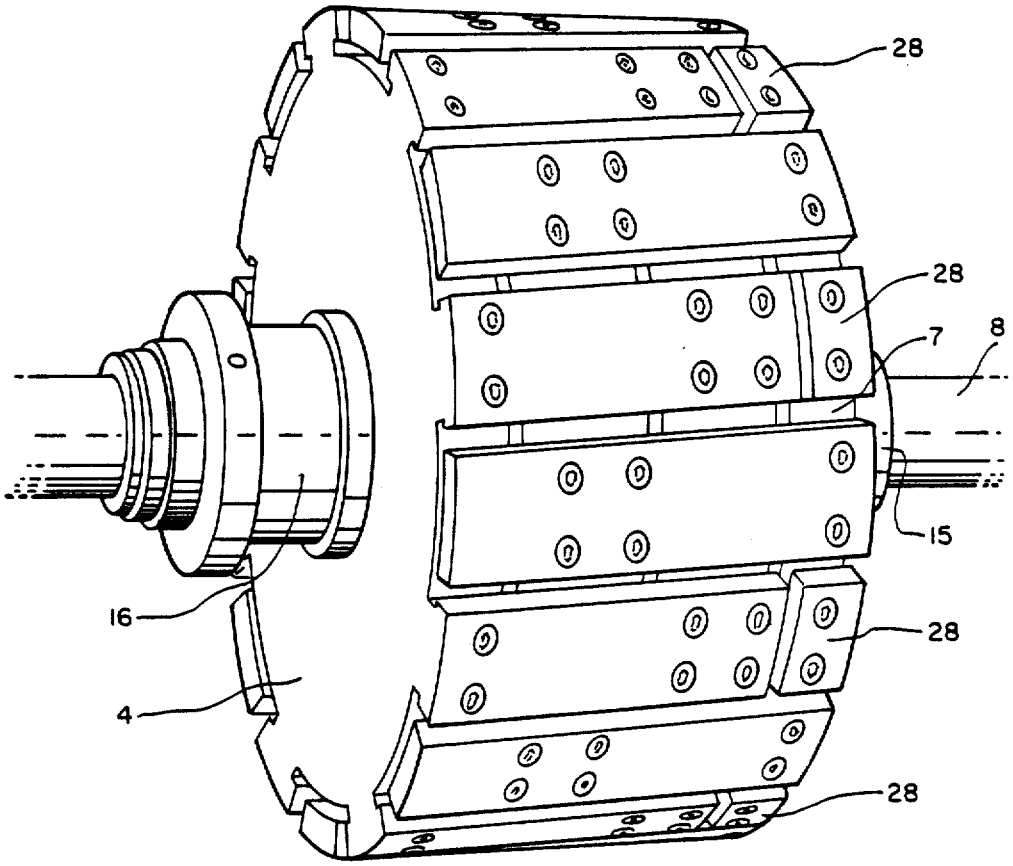

Certain embodiments of the invention will now be described by way of example with reference to the accompanying drawings and in which:

FIG. 1 is an end elevation of a rotor [constructed in accordance with] *not including the stabilizing region of* the invention, together with the schematic cross-section of a stator, FIG. 2 is a longitudinal section of the rotor illustrated in FIG. 1, FIG. 3 is a perspective view of the rotor of FIGS. 1 and 2, and FIG. 4 is a perspective view of a modified rotor *constructed in accordance with the invention.*

In FIGS 1, 2 and 3 the rotor illustrated has 16 poles and comprises three permanent magnet discs 1, 2 and 3 axially magnetised as indicated in FIG. 1. Disc shaped steel elements 4, 5, 6 and 7 and disposed on either side of the magnets and touching the magnets at their pole faces are mounted on the shaft 8 made of stainless steel and are keyed on to it. The outer steel discs 4 and 7 are thinner than the discs 5 and 6 since they carry less flux. The steel discs overlap the magnets by a small amount sufficient to retain the magnets. Pole parts 9, 10, 11 and 12 either projecting from the steel discs or forming part of pole shoes 13 and 14 link the discs with the pole shoes magnetically. Hence polarities are induced on the pole shoes according to the magnetic discs to which they are coupled by way of the steel discs. Each pole shoe is connected to alternate steel discs along the rotor so that polarities on the pole shoes alternate around the rotor periphery. The magnet disc assembly is clamped between a flange 15 on the shaft at one end and a threaded nut or other clamping device 16 at the other end of the magnet assembly. The pole shoes can be bolted on by means of screws 17, 18, 19 and 20 or otherwise for ease of assembly.

Since the magnets have a relatively large combined pole area and the magnetic flux is brought out to a number of relatively small area pole parts, a fairly inexpensive type of magnet such as a barium ferrite magnet can be used. Each of the discs 5 and 6 distributes magnetic flux to those parts of the pole shoes which extend in opposite directions from one another from a radial axis of the disc for a distance approximately equal to the distance between the radial axes of the disc. Hence these discs must be of a cross-sectional area sufficient to carry the flux available from the magnets without saturation. Also the pole shoes 13 and 14 must have cross-sectional areas sufficient to carry the flux, required for those parts of the pole shoes which project from the discs, without saturation.

Epoxy resin can be cast on top of the magnets if desired to help to retain them. It will be understood that the invention can be applied to rotors having pole numbers other than sixteen.

The steel discs, pole parts and pole shoes can be made as integral members provided that the pole shoes are divided as shown by the dashed lines 22. Each disc will then have integral pole parts and pole shoes in alternate pole positions. The rotor is clamped together in the way already described, with the parts of the pole shoes adjacent but not necessarily in contact.

Since the rotor can be extended as desired in the axial direction by adding disc magnets and steel discs and it has in effect a number of permanent magnetic poles, it may be used in any conventional induction motor stator having a distributed winding, with conductors extending the whole length of the rotor periphery located in slots in the stator periphery, to form an a.c. generator or a synchronous motor. Part of such a stator is shown schematically in cross-section in FIG. 1 at 25 with slots 26 and conductors 27. The stator winding should of course have the same number of poles as the rotor.

The operation of the machine is conventional for machines with permanent magnet rotors and will be apparent to those skilled in the art.

A machine constructed in accordance with FIGS. 1, 2 and 3 will not start as a synchronous motor without being brought up to synchronous speed, or by reduction in supply frequency for starting.

This problem can be overcome giving the steel disc 7 pole shoes at every pole position where a pole from another disc would otherwise overlap as seen at 28 in FIG. 4. Thus the disc 7 and its pole shoes are made into what is, in effect, a solid steel rotor having a starting action similar to that of the known solid rotor induction motor. After running up to full speed the toothed wheel formed by the pole shoes and the disc 7 will run at synchronous speed, in known manner, as a reluctance motor. Hence when operating as a motor the machine will start as an induction motor and run at synchronous speed partly as a reluctance motor, and partly as a synchronous motor by virtue of the permanent magnets.

The addition of the "toothed wheel" also *provides a stabilizing region which* stabilizes the speed of the motor and minimises load angle oscillation when acting as a generator. In fact the machine of FIG. 4 can be used as a generator with only a small loss in efficiency and some gain in stability.

Again the steel discs can be made with integral pole parts and pole shoes, the pole shoes again being separated in the same places as the rotor of FIG. 3.

As can be seen in FIGS. 3 and 4 the pole shoes are skewed in relation to the rotor axis and this has been found to reduce harmonics in the stator winding since it has an effect analogous to a better distribution of the stator winding.

Although some forms of rotors, alternators and motors according to the invention have been specifically described it will be appreciated that the invention can be put into practice in many other ways.

I claim:

1. An alternating current electrical machine comprising a stator having an inner periphery with slots containing conductors of a distributed winding, and a rotor mounted to rotate with its outer periphery adjacent to the inner periphery of the stator, the rotor comprising a plurality of permanent [magnets,] *magnet means* spaced apart along the axis of rotation of the rotor with their [magnetic axes coincident with the said axis and, with their] directions of magnetization parallel to the said axis, a plurality of *main* pole shoes spaced apart around the rotor periphery [and extending substantially continuously for at least three-quarters of the whole axial length of the rotor periphery], and a plurality of flux guides arranged to couple the poles of the permanent [magnets] *magnet means* to the *main* pole shoes magnetically to give the *main* pole shoes polarities which alternate around the rotor periphery but which are the same in the axial direction of the rotor over more than half the length of the outer periphery of the rotor, the flux guides and the *main* pole shoes being arranged to ensure that the flux density at the *main* pole shoes is high compared with that at the permanent magnet means, *and the rotor including a speed stabilizing region having a periphery substantially formed from a plurality of circumferentially spaced salient portions of magnetic material defining spaces therebetween and a coupling portion joining substantially every salient portion to its neighboring salient portions on both sides thereof by means of a path in magnetic material, said path not including the permanent magnet means or any axial shaft for the rotor.*

2. A machine according to claim 1 wherein the conductors of the stator winding extend substantially the whole axial length of the outer rotor periphery.

3. A machine according to claim 2 wherein at least half the *main* pole shoes extend for substantially the whole axial length of the outer rotor periphery.

4. A machine according to claim 3 wherein the stator winding is wound to provide a number of poles equal to the number of *main* pole shoes of the rotor.

5. A machine according to claim [4] *1* wherein the permanent [magnets] *magnet means* have like poles adjacent but separated by radial elements of the flux guides, the elements extending in a radial direction with respect to the said axis, radial elements of the guides also being positioned at the outer ends of the outer magnetic means in the rotor, and the *main* pole shoes being elongated, with their axes generally parallel to the said axis and with each *main* pole shoe magnetically coupled to at least one element.

[6. A machine according to claim 5 wherein alternate pole shoes extend only part of the way along the rotor periphery in the axial direction and auxiliary pole shoes occupy positions in the rotor periphery which are generally axially aligned with the said alternate pole shoes, the auxiliary pole shoes being supported by one of the elements which also support the adjacent full length pole shoes and the auxiliary pole shoes and the elements supporting those shoes being of a material which would allow the rotor to start rotation by induction motor action if the stator winding were coupled to an appropriate alternating current source.]

7. A machine according to claim 5 wherein the *main* pole shoes connect substantially axially aligned pole parts.

8. A machine according to claim 5 wherein the [magnets] *magnet means* include at least one material of the group consisting of barium ferrite, strontium ferrite, ticonal, alnico or one of the samarium cobalt materials.

9. A machine according to claim 5 wherein each permanent magnet *means* is a generally disc shaped magnet and each flux guide includes a generally disc shaped element, made of magnetic material, with radially projecting portions supporting the *main* pole shoes.

10. A machine according to claim 9 wherein the magnets include at least one of the following materials: barium ferrite, strontium ferrite, ticonal, alnico or one of the samarium cobalt materials.

11. A machine according to claim 10 wherein the elements and *main* pole shoes are of steel.

12. A machine according to claim 9 with one more flux guide than disc magnet, and each disc magnet being positioned between flux guides.

13. A machine according to claim 9 wherein in each pair of adjacent *main* pole shoes, one pole shoe is supported by alternate disc shaped elements in the axial direction and the other pole shoe is supported by the remaining disc shaped elements.

14. A machine according to claim 13 wherein the rotor has an axial shaft at least the periphery of which is made of non-magnetic material, and the magnets and the elements have central apertures through which the shaft passes.

15. A machine according to claim 1, wherein the *main* pole shoes are elongated in the said axial direction and are skewed relative to the rotor axis.

[16. A machine according to claim 1, wherein the rotor includes a portion so constructed that with an appropriate alternating current source coupled to the stator winding, the rotor will begin to rotate from rest by induction motor action.]

17. A machine according to claim 1 wherein the *main* pole shoes project in both directions parallel to the rotor axis away from at least some of the positions at which the *main* pole shoes are coupled to flux guides situated between two permanent magnet means, and the pole shoes are integral at the said positions.

18. A permanent magnet rotor for an alternating current generator or motor, including at least two generally disc shaped axially magnetised permanent magnets each having an aperture at its centre, on each side of which magnets are generally disc shaped elements of magnetic material with central apertures and a number of radially projecting pole parts on their outer peripheries, *main* pole shoes arranged radially on the pole parts extending [substantially continuously for at least three quarters of the whole axial length of the rotor periphery] over the said elements in the axial direction, and a metal hub, having at least a periphery of non-magnetic material, which passes through the apertures in the magnets and the elements, the elements being so arranged that the pole parts of elements adjacent to permanent magnet poles of the same polarity are substantially axially aligned with one another and with gaps between the pole parts of elements adjacent to permanent magnet poles of the opposite polarity and the disc shaped elements, the pole parts and the pole shoes being arranged to ensure that the flux density at the pole shoes is high compared with that at the permanent magnets, *and the rotor including a speed stabilizing region having a periphery substantially formed from a plurality of circumferentially spaced salient portions of magnetic material defining spaces therebetween and a coupling portion joining substantially every salient portion to its neighboring salient portions on both sides thereof by means of a path in magnetic material, said path not including the permanent magnets.*

19. A rotor according to claim 18 wherein the pole shoes connect substantially axially aligned pole parts.

*20. A machine according to claim 1 wherein the coupling portion includes a generally planar member of magnetic material positioned normal to the rotor axis.*

*21. A machine according to claim 20 wherein alternate main pole shoes extend only part of the way along the rotor periphery in the axial direction, and auxiliary pole shoes occupy positions in the periphery of the said stabilizing region which are substantially axially aligned with the said alternate main pole shoes, the auxiliary pole shoes being supported by one of the flux guides which forms the said coupling portion, and the auxiliary pole shoes and those portions of those main pole shoes which are between the alternate pole shoes and in the stabilizing region forming the said salient portions.*

*22. A rotor according to claim 19 wherein the coupling portion includes a generally planar member of magnetic material positioned normal to the rotor axis.*

*23. A rotor according to claim 22 wherein alternate main pole shoes extend only part of the way along the rotor periphery in the axial direction, and auxiliary pole shoes occupy positions in the periphery of the said stabilizing region which are substantially axially aligned with the said alternate main pole shoes, the auxiliary pole shoes being supported by one of the flux guides which forms the said coupling portion, and the auxiliary pole shoes and those portions of those main pole shoes which are between the alternate pole shoes and in the stabilizing region forming the said salient portions.*

* * * * *